(12) United States Patent
Walters

(10) Patent No.: US 12,473,006 B1
(45) Date of Patent: Nov. 18, 2025

(54) CAR SEAT TRANSPORT DEVICE

(71) Applicant: Jessica Walters, Montgomery, AL (US)

(72) Inventor: Jessica Walters, Montgomery, AL (US)

(*) Notice: Subject to any disclaimer, the term of this patent is extended or adjusted under 35 U.S.C. 154(b) by 242 days.

(21) Appl. No.: 18/126,778

(22) Filed: Mar. 27, 2023

(51) Int. Cl.
*B62B 3/02* (2006.01)
*B60N 2/28* (2006.01)
*B62B 3/04* (2006.01)
*B62B 5/06* (2006.01)
*B62B 7/10* (2006.01)
*B62B 7/14* (2006.01)
*B62B 9/20* (2006.01)

(52) U.S. Cl.
CPC ............ *B62B 7/142* (2013.01); *B60N 2/2848* (2013.01); *B62B 3/02* (2013.01); *B62B 3/04* (2013.01); *B62B 5/067* (2013.01); *B62B 7/105* (2013.01); *B62B 7/145* (2013.01); *B62B 9/20* (2013.01); *B62B 2202/32* (2013.01); *B62B 2206/02* (2013.01)

(58) Field of Classification Search
CPC .. B62B 3/007; B62B 3/04; B62B 3/02; B62B 3/022; B62B 5/067; B62B 5/08; B62B 5/082; B62B 2202/32; B62B 2206/02; B62B 2206/04
See application file for complete search history.

(56) References Cited

U.S. PATENT DOCUMENTS

| | | | |
|---|---|---|---|
| 2,469,242 A * | 5/1949 | Pohl | B62B 3/02 280/651 |
| 4,291,915 A | 9/1981 | Cox | |
| 4,796,909 A * | 1/1989 | Kirkendall | B62B 3/02 180/906 |
| 4,976,448 A * | 12/1990 | Wickersham | B62B 1/008 280/47.23 |
| D348,132 S * | 6/1994 | McCoy | D34/17 |

(Continued)

FOREIGN PATENT DOCUMENTS

| CN | 114802394 A * | 7/2022 |
|---|---|---|
| CN | 115027540 A * | 9/2022 |

(Continued)

*Primary Examiner* — Emma K Frick
(74) *Attorney, Agent, or Firm* — Cramer Patent & Design, PLLC.; Aaron R. Cramer

(57) ABSTRACT

A Car Seat Transportation Device is an apparatus that holds and transports a car seat when it is out of a vehicle. The device takes the form of a cart supported by four (4) casters that rotate three-hundred-sixty degrees (360°) (spinner style), that easily roll over almost any surface. The rear of the device is provided with handle system, that adjusts in height, and is similar to that of a handle found on a stroller. The top of the platform, or base, that holds the removed car seat is adjustable, allowing use with almost any make or model of car seat. These features allow the device to safely hold a car seat with an infant or child inside of a home and also allow the car seat to function as a stroller as well. It also allows a parent or care giver to remove the car seat from a car with the infant or child still in place and place it on the device thus transforming it into a stroller without disturbing the child. It is great for travel, especially when moving between gates in an airport. Finally, when not in use, the device collapses, and folds for easy storage almost anywhere.

2 Claims, 8 Drawing Sheets

(56) References Cited

U.S. PATENT DOCUMENTS

| | | | |
|---|---|---|---|
| 5,779,252 A * | 7/1998 | Bolton, Jr. | B62B 3/02 |
| | | | 280/35 |
| 5,826,670 A * | 10/1998 | Nan | A61G 5/1051 |
| | | | 180/211 |
| 5,833,251 A * | 11/1998 | Peck | B62B 3/02 |
| | | | 280/87.01 |
| 5,899,467 A | 5/1999 | Henkel | |
| 5,988,657 A | 11/1999 | Henkel | |
| 6,241,313 B1 | 6/2001 | Lenz et al. | |
| 6,923,468 B1 * | 8/2005 | Barnett | B62B 19/02 |
| | | | 280/35 |
| 7,051,853 B2 | 5/2006 | Brown | B62B 7/06 |
| | | | 280/37 |
| 7,503,571 B2 * | 3/2009 | Cromie | B62B 3/16 |
| | | | 280/47.11 |
| 8,182,030 B1 | 5/2012 | Britten | |
| 8,286,767 B2 | 10/2012 | Malinowski | |
| 8,662,267 B1 | 3/2014 | Hart et al. | |
| 8,827,305 B2 * | 9/2014 | Saito | B62B 5/067 |
| | | | 280/655.1 |
| 8,939,455 B1 * | 1/2015 | Terry | B62B 9/00 |
| | | | 280/87.051 |
| 9,145,155 B2 * | 9/2015 | Iryami | B62B 3/002 |
| 9,187,110 B2 * | 11/2015 | Bar Noy | B62B 3/02 |
| 9,254,857 B2 * | 2/2016 | Fiebelkorn | A45C 5/14 |
| 9,456,941 B2 * | 10/2016 | Mizrachi | A61G 5/0875 |
| 9,694,838 B2 * | 7/2017 | Gullino | B62B 3/02 |
| 9,738,181 B1 | 8/2017 | Termini | |
| 9,758,184 B1 * | 9/2017 | Vaverek | B62B 5/06 |
| 9,963,158 B2 * | 5/2018 | Biesinger | B62B 5/067 |
| 10,392,043 B2 * | 8/2019 | Guerdrum | B62B 5/067 |
| 10,543,862 B1 * | 1/2020 | Aguirre | B62B 5/06 |
| D890,819 S * | 7/2020 | Webber | D15/89 |
| 11,058,198 B2 | 7/2021 | Ubben | |
| 11,420,319 B2 * | 8/2022 | Peterson | F16M 11/2092 |
| 12,065,183 B2 * | 8/2024 | Laudani | B62B 3/02 |
| 12,128,796 B2 * | 10/2024 | Churilla | B62B 9/20 |
| 2004/0026882 A1 * | 2/2004 | Brown | B62B 7/06 |
| | | | 280/47.34 |
| 2010/0059970 A1 * | 3/2010 | Scott | B62B 7/12 |
| | | | 280/658 |
| 2021/0284221 A1 * | 9/2021 | Perez | B62B 5/0046 |

FOREIGN PATENT DOCUMENTS

| | | | | |
|---|---|---|---|---|
| CN | 115215259 A | * | 10/2022 | B60F 1/02 |
| DE | 202019002514 U1 | * | 8/2019 | |
| EP | 3335964 A1 | * | 6/2018 | B62B 3/022 |
| IT | RE20100024 A1 | * | 9/2011 | |
| KR | 20110004747 U | * | 5/2011 | |
| NL | 2007446 C2 | * | 3/2013 | |

* cited by examiner

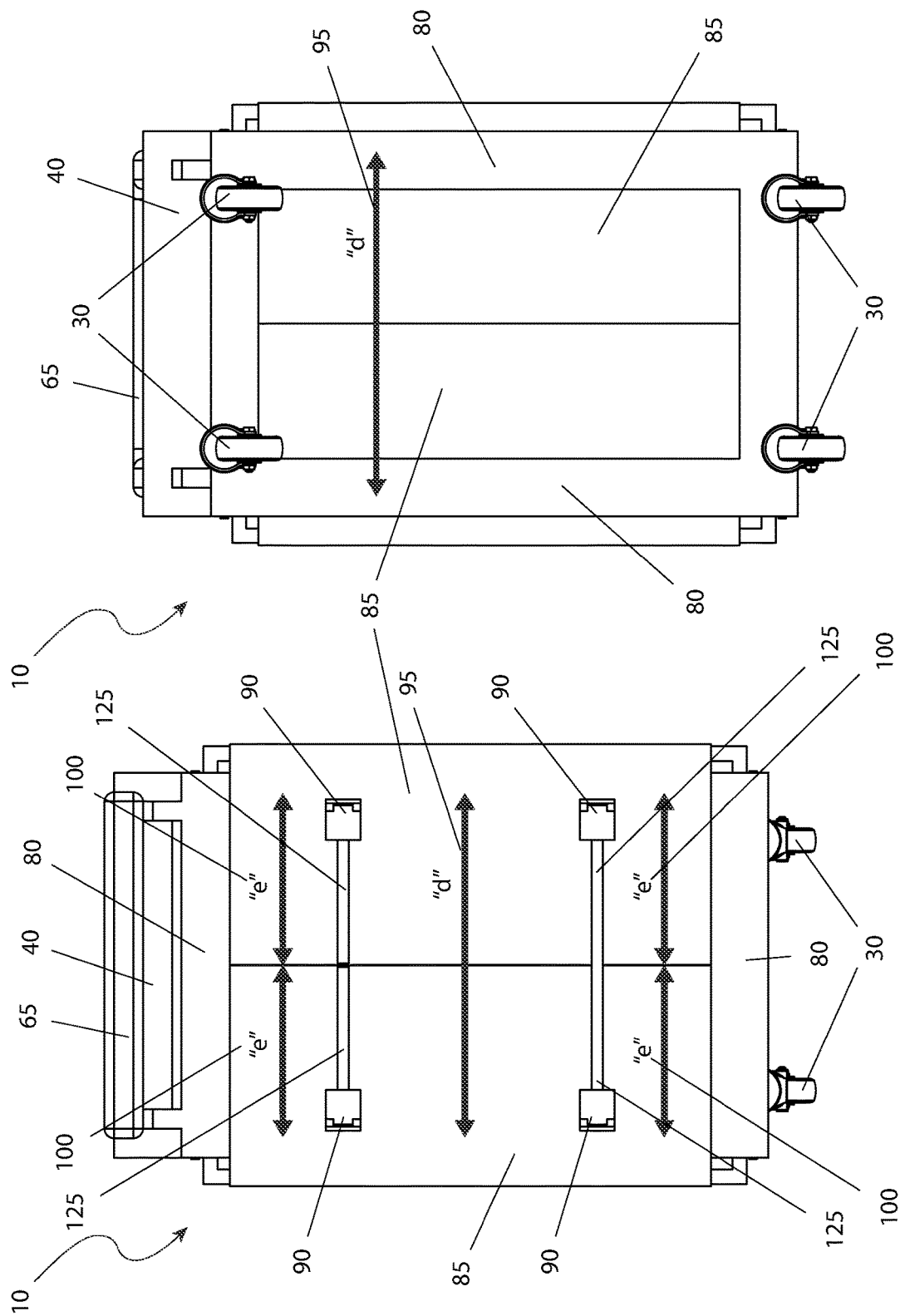

CAR SEAT TRANSPORT DEVICE

RELATED APPLICATIONS

None.

FIELD OF THE INVENTION

The present invention relates generally to a transportation device and more specifically to a car seat transportation device.

BACKGROUND OF THE INVENTION

Infants are delicate little beings that require the utmost care in order protect and keep them safe from harm. As a result, there is a myriad of products intended to provide protection from the danger generated by a variety of sources. Perhaps two of the most common items that come to mind when thinking of infant safety are the car seat and the stroller. These two items securely hold the infant in place, protect them while being transported and allow them to be moved from place to place with relative ease.

However, they must be taken everywhere even though only one is used at time. Additionally, a sleeping child or infant often awakens when moved between the two. Accordingly, there is a need for a means by which a child can safely be transported at all times whether in or out of car in a manner that addresses the above deficiencies. The development of the Car Seat Transportation Device fulfills this need.

SUMMARY OF THE INVENTION

To achieve the above and other objectives, the present invention provides for a car seat transport device that includes a horizontal car seat secured to a vertical base section with a fixed bottom platform and two moving upper platforms. The base section has a handle section attached by a folding hinge mechanism, which includes a pair of lower outer handles and a pair of retracting inner handles. The car seat back is positioned against the retracting inner handles to provide stability, and there are four 360° casters on each of the outer corners of the fixed bottom platform. The moving upper platforms support four holding clamps for securely holding the car seat, and they can move outward to widen the base section for storage. The handle section is controlled by a handle release lever, which prevents unwanted movement unless activated by a simultaneous pressing motion.

The folding hinge mechanism may allow the handle section to fold flat against the base section along a handle folding travel path. The folding hinge mechanism may include the handle section. The pair of retracting inner handles may be connected together by a handle cap. The handle cap may include the handle section. The handle section may be in a collapsed state, with the pair of retracting inner handles inside of the lower outer handles. The pair of retracting inner handles may slide in and out of the lower outer handles along a handle extension travel path and are held at their uppermost position by use of a pair of handle extension locking pins. The pair of handle extension locking pins may be simultaneously pressed, the pair of retracting inner handles retract into the lower outer handles. The car seat transport device may provide for the ease of transport of the car seat removed from a motor vehicle with a child inside. The car seat transport device may provide for the ease of transport of the car seat removed from a motor vehicle without the child inside.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 7 is a top view of the car seat transport device, according to the preferred embodiment of the present invention;

FIG. 8 is a bottom view of the car seat transport device, according to the preferred embodiment of the present invention;

Figure 1:
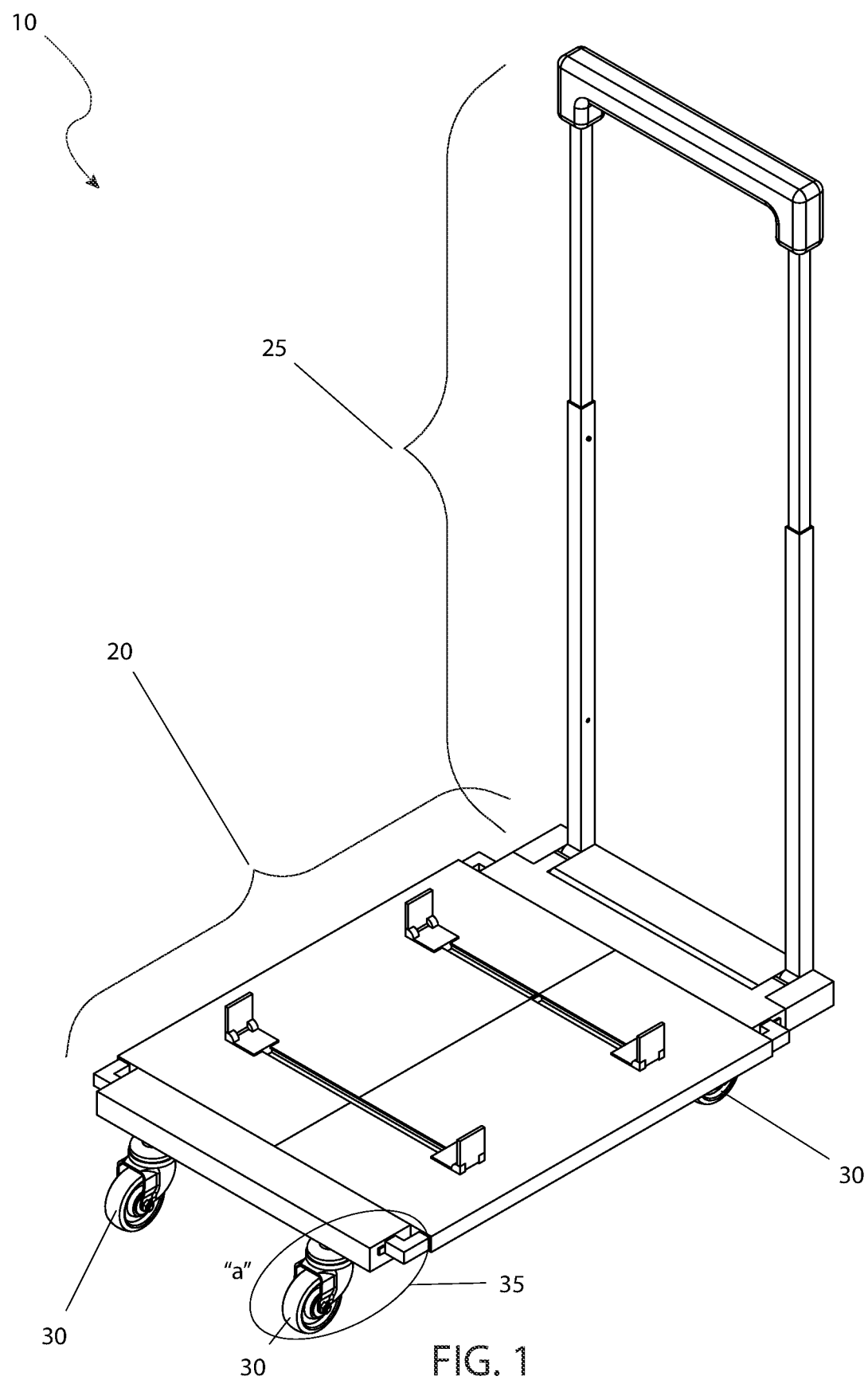
FIG. 1 is a front perspective view of the car seat transport device, according to the preferred embodiment of the present invention.

DESCRIPTIVE KEY 10 car seat transport device
15 car seat
20 base section
25 handle section
30 caster
35 full rotation travel path "a"
40 folding hinge mechanism
45 handle folding travel path "b"
50 handle release lever
55 lower outer handle
60 retracting inner handle
65 handle cap
70 handle extension travel path "c"
75 handle extension locking pin
80 fixed bottom platform
85 moving upper platform
90 holding clamp
95 upper platform moving path "d"
100 clamp movement path "e"
105 support arm
110 base locking pin
115 base arm support hole
120 car seat base 125 clamp track
130 car seat back

DESCRIPTION OF THE PREFERRED EMBODIMENTS

The best mode for carrying out the invention is presented in terms of its preferred embodiment, herein depicted within FIGS. 1 through 10. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one of the referenced items.

1. Detailed Description of the Figures

Referring now to FIG. 1, a front perspective of the car seat transport device 10, according to the preferred embodiment of the present invention is disclosed. The car seat transport device (herein also described as the "device") 10, provides for the ease of transport of a car seat 15 (not shown in this FIG.), removed from a motor vehicle, with or without a child inside. It is intended for use in an airport or similar location. The device 10 includes a car seat 15, planar in nature, arranged in a horizontal orientation and a base section 20, arranged in a vertical orientation. The car seat 15 would be placed and secured on the base section 20, as will be described in greater detail herein below. The device 10 is supported by four (4) 360-degree (360°) casters 30, arranged at the distal corners of the base section 20. Each caster 30 is capable of traveling and moving in a full rotation travel path "a" 35. As such, the device 10 may be pushed or pulled by the handle section 25 in a direction without the confines of a wheel that can only roll forward and backwards. Such movement is viewed as advantageous in crowded locations such as airports, shopping malls, train stations, cruise ships, and similar locations where the device 10 and a car seat 15 would be present.

Figure 2:
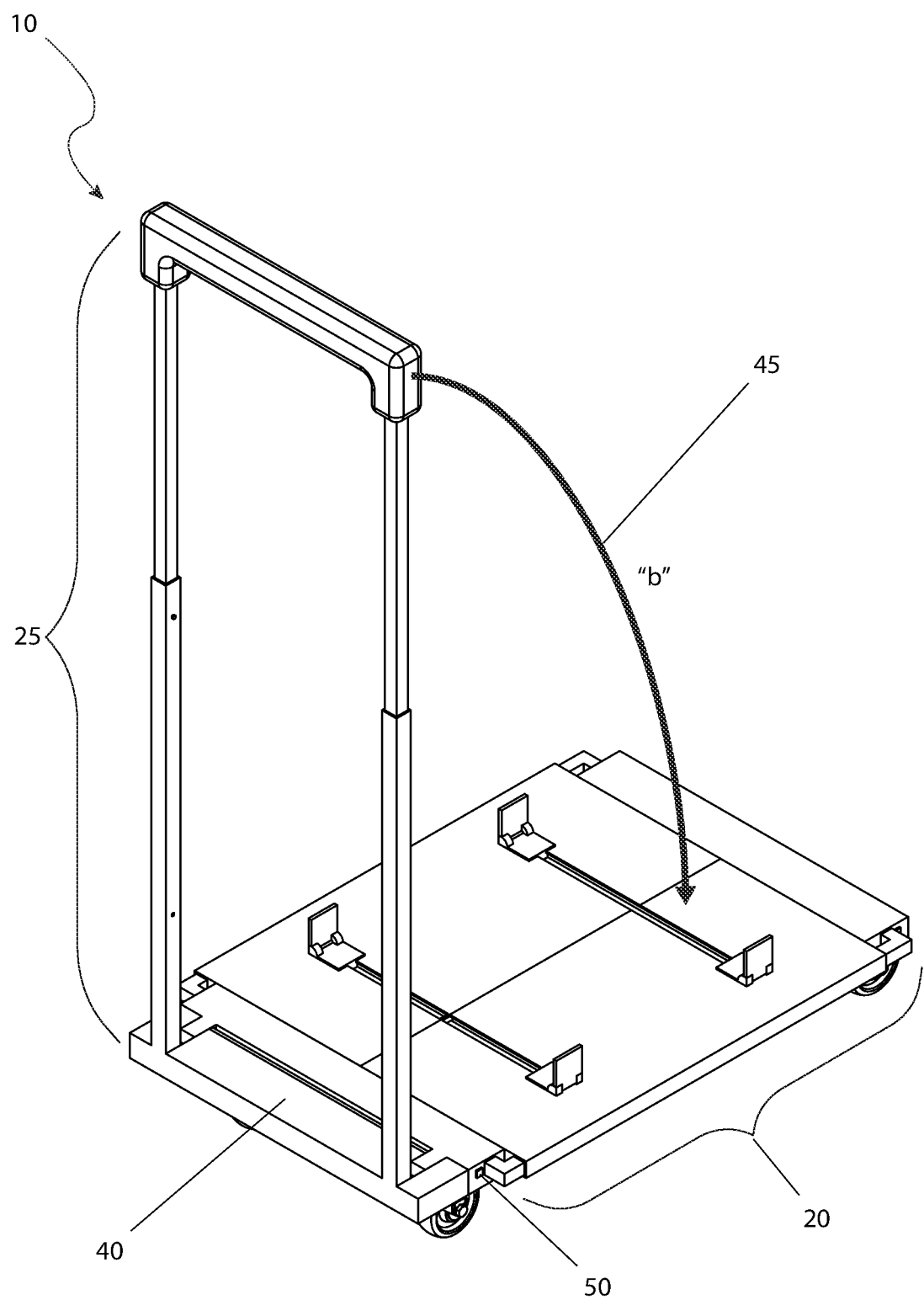
FIG. 2 is a rear perspective view of the car seat transport device, according to the preferred embodiment of the present invention.

Referring next to FIG. 2, a rear perspective view of the device 10, according to the preferred embodiment of the present invention is depicted. The handle section 25 is attached to the base section 20 by use of a folding hinge mechanism 40. The folding hinge mechanism 40 allows the handle section 25 to fold flat against the base section 20 along a handle folding travel path "b" 45. The movement of the handle section 25 from an upright (deployed) position (as shown) to the downward (retracted) position, is controlled by a handle release lever 50. The handle release lever 50 prevents unwanted movement of the handle section 25 unless it is activated by a simultaneous pressing motion.

Figure 3:
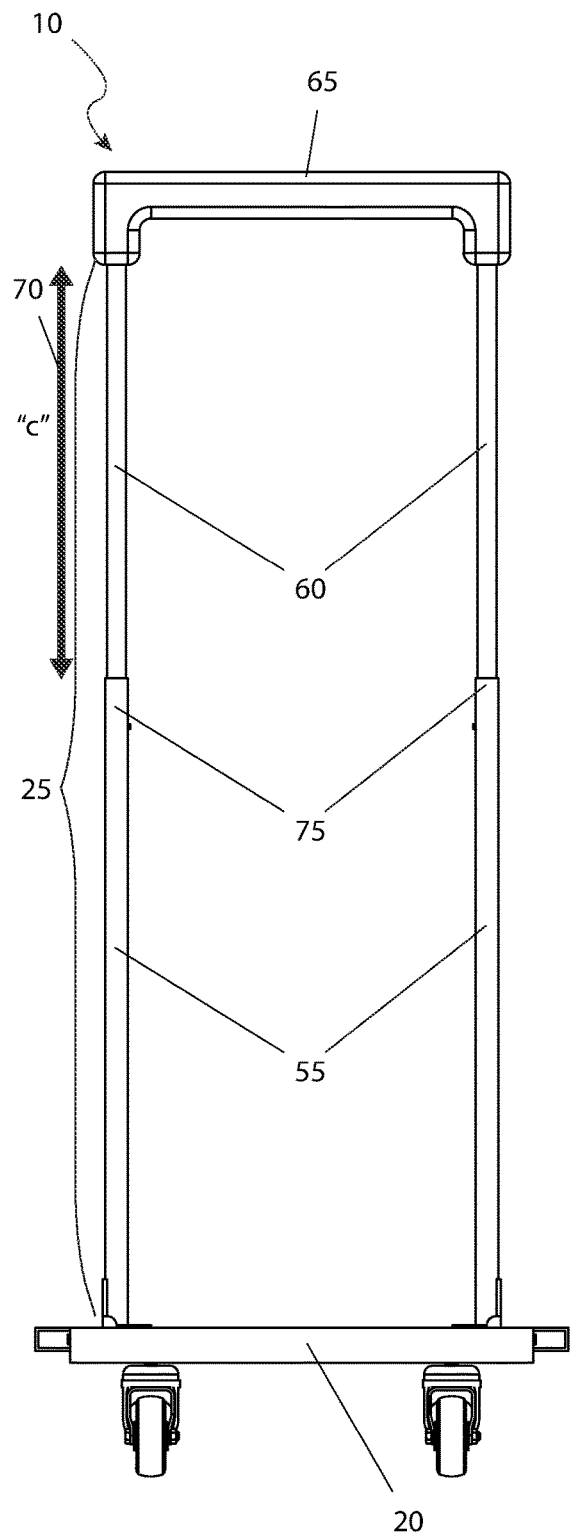
FIG. 3 is a front view of the car seat transport device, according to the preferred embodiment of the present invention.
Figure 4:
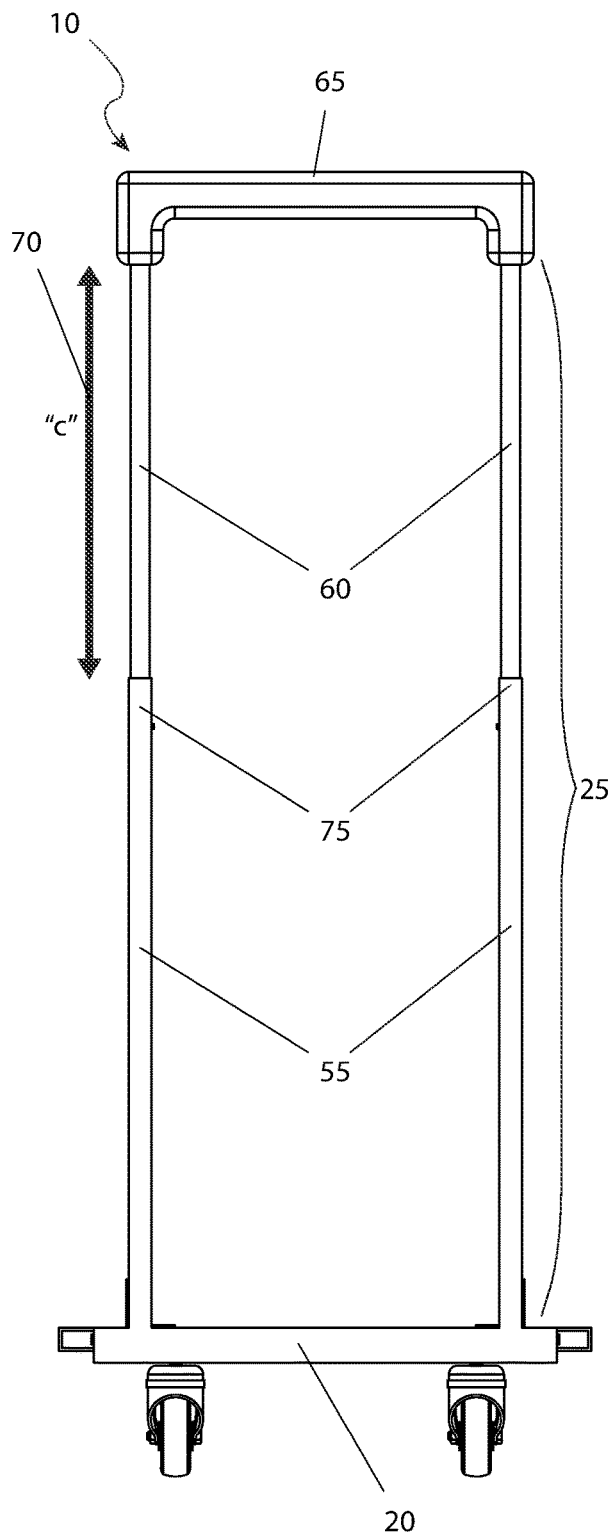
FIG. 4 is a rear view of the car seat transport device, according to the preferred embodiment of the present invention.

Referring now to FIG. 3 and FIG. 4, a front view of the device 10 and a rear view of the device 10, respectively, according to the preferred embodiment of the present invention is shown. These figures provide additional clarification of the handle section 25 positioned atop the base section 20. The handle section 25 includes two (2) lower outer handles 55 and two (2) retracting inner handles 60. The two (2) retracting inner handles 60 are connected together by a handle cap 65. The retracting inner handles 60 slide in and out of the lower outer handles 55 along a handle extension travel path "c" 70. The retracting inner handles 60 are held at their uppermost position by use of two (2) handle extension locking pins 75. When the handle extension locking pins 75 are simultaneously pressed, the retracting inner handles 60 may retract into the lower outer handles 55 thus providing a total handle height of the handle section 25 of approximately one-half (½) of the height as shown in FIGS. 3 and 4. This operation is viewed as similar to that expected of rolling luggage with a retractable handle.

Figure 5:
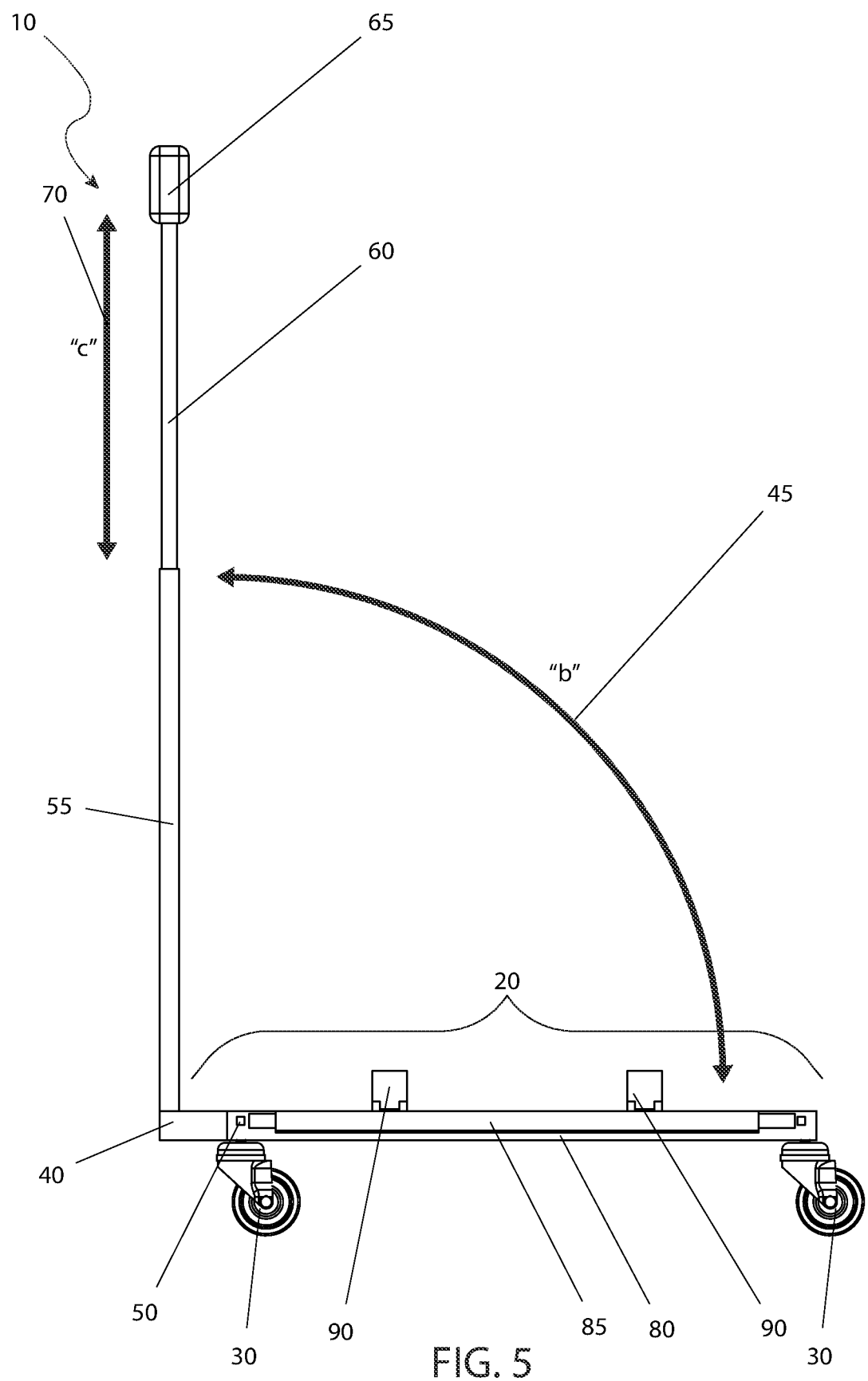
FIG. 5 is a left view of the car seat transport device, according to the preferred embodiment of the present invention.
Figure 6:
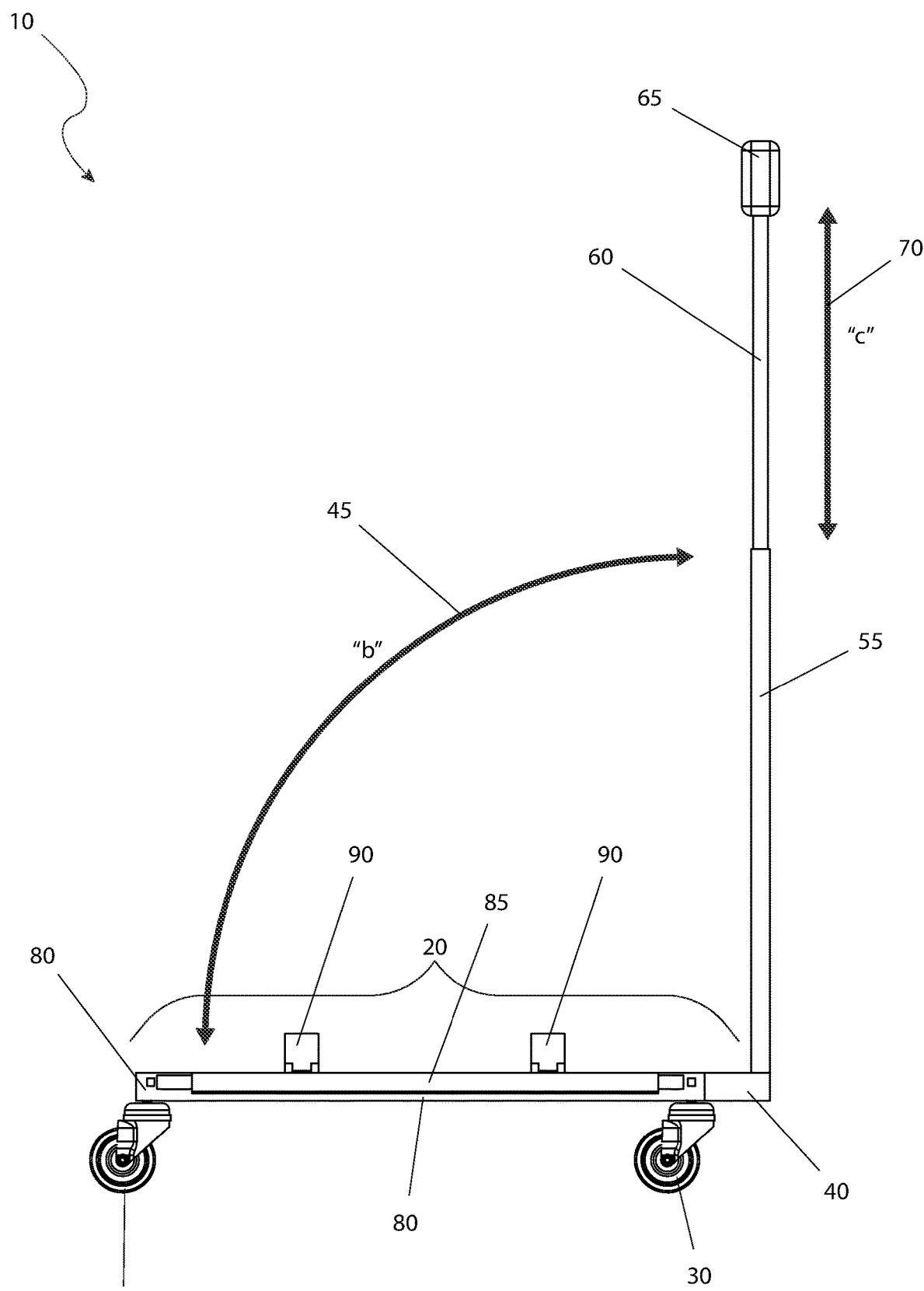
FIG. 6 is a right view of the car seat transport device, according to the preferred embodiment of the present invention.

Referring next to FIG. 5 and FIG. 6, a left view of the device 10, and a right view of the device 10, respectively, according to the preferred embodiment of the present invention is disclosed. These figures provide additional clarification on the operation of the device 10 with regards to movement of the retracting inner handles 60 into the lower outer handles 55 along the handle extension travel path "c" 70 as controlled by the handle extension locking pins 75 (as shown in FIGS. 3 and 4), and then the subsequent movement of the lower outer handles 55 and the handle cap 65 downward along the handle folding travel path "b" 45 such that said components are flat against the base section 20. The handle folding travel path "b" 45 is permitted by activation of the handle release lever 50 on the folding hinge mechanism 40. The base section 20 includes a fixed bottom platform 80 and two (2) moving upper platforms 85 (of which only one (1) is shown due to illustrative limitations). The fixed bottom platform 80 supports the four (4) casters 30 while the two (2) moving upper platforms 85 support a total of four (4) holding clamps 90. The holding clamps 90 are used to securely hold the car seat 15 (not shown in this FIGURE).

Referring now to FIG. 7 and FIG. 8, a top view of the device 10, and a bottom view of the device 10, respectively, according to the preferred embodiment of the present invention is depicted. The casters 30 are positioned at the outer corners of the fixed bottom platform 80. The handle cap 65 and the folding hinge mechanism 40 are positioned at the rear of the device 10 and form the handle section 25 (as shown in FIG. 1). The two (2) moving upper platforms 85 move in outward manner along an upper platform moving path "d" 95 to provide for a widening of the base section 20 approximately twice (2×) the width as shown. Such widening is envisioned as being useful to accommodate wide car seat 15 (not shown in this figure) when the device 10 is being utilized, and provide for a small volume, for purposes of storage, when not being used. The holding clamps 90 move along a clamp movement path "e" 100 to accommodate all different widths of car seat 15 as expected for different makes and models of car seat 15.

Figure 9:
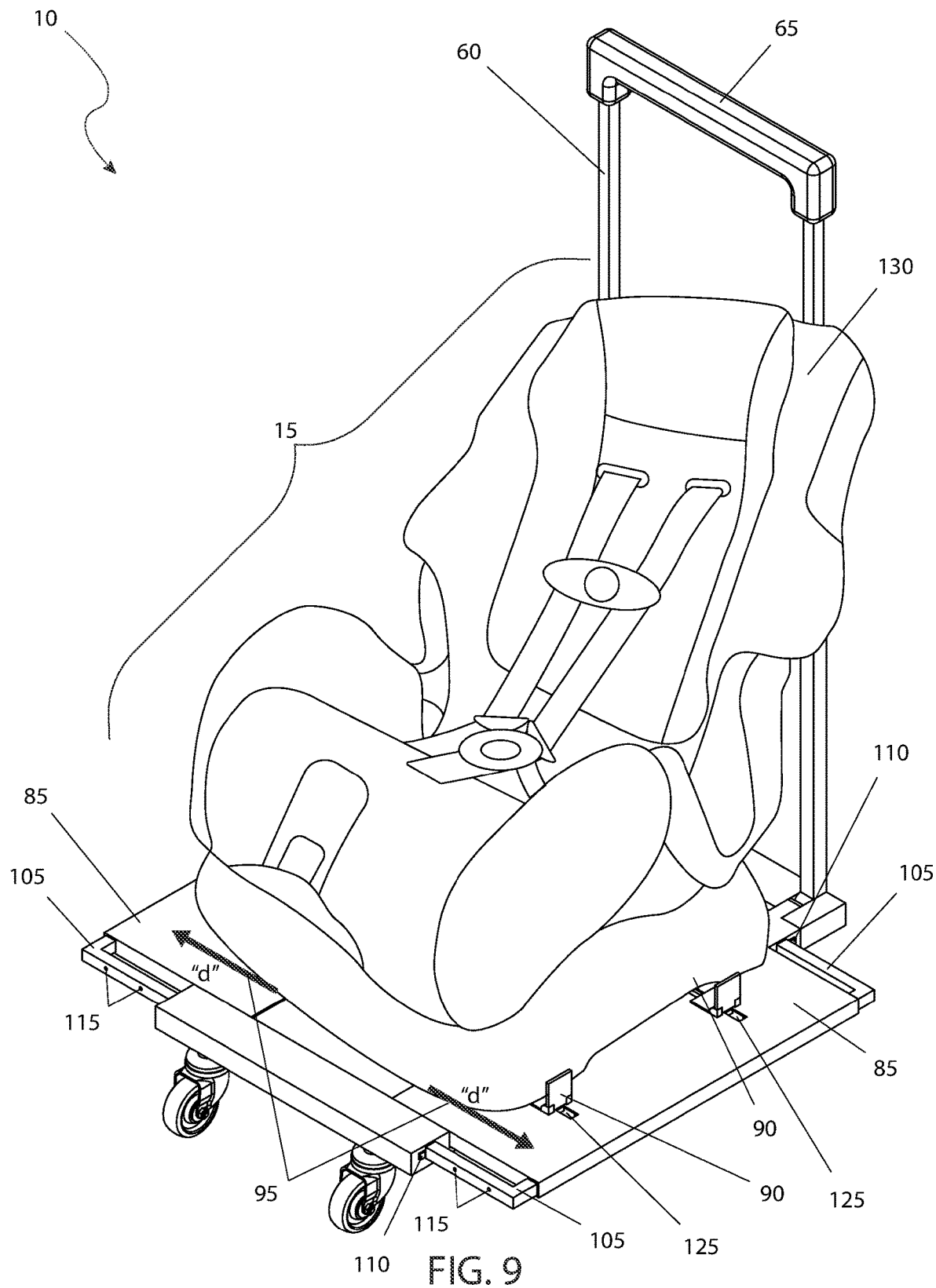
FIG. 9 is a perspective view of the car seat transport device in an extended and utilized state, according to the preferred embodiment of the present invention.

Referring next to FIG. 9, a perspective view of the device 10 in an extended and utilized state, according to the preferred embodiment of the present invention is shown. The two moving upper platforms 85 are shown in an outward position, along the upper platform moving path "d" 95, as supported by four (4) support arms 105 (of which only three (3) are shown due to illustrative limitations). The support arms 105 are locked into position by base locking pins 110 that engage a plurality of base locking pins 110. Final securement of a car seat base 120 of the car seat 15 is provided by the holding clamps 90 in a clamp track 125, as shown by the clamp movement path "e" 100 (as shown in FIGS. 7 and 8). The car seat back 130 is positioned against the retracting inner handles 60, near the handle cap 65, to provide stability for the car seat 15. Such an orientation as shown in FIG. 9 is envisioned to allow for ease of transport of the car seat 15 in locations such as airports. A child may or may not be placed inside of the car seat 15 during use and subsequent transport. This use is envisioned to eliminate the need for a separate stroller as well the need to physically carry a heavy car seat 15.

Figure 10:
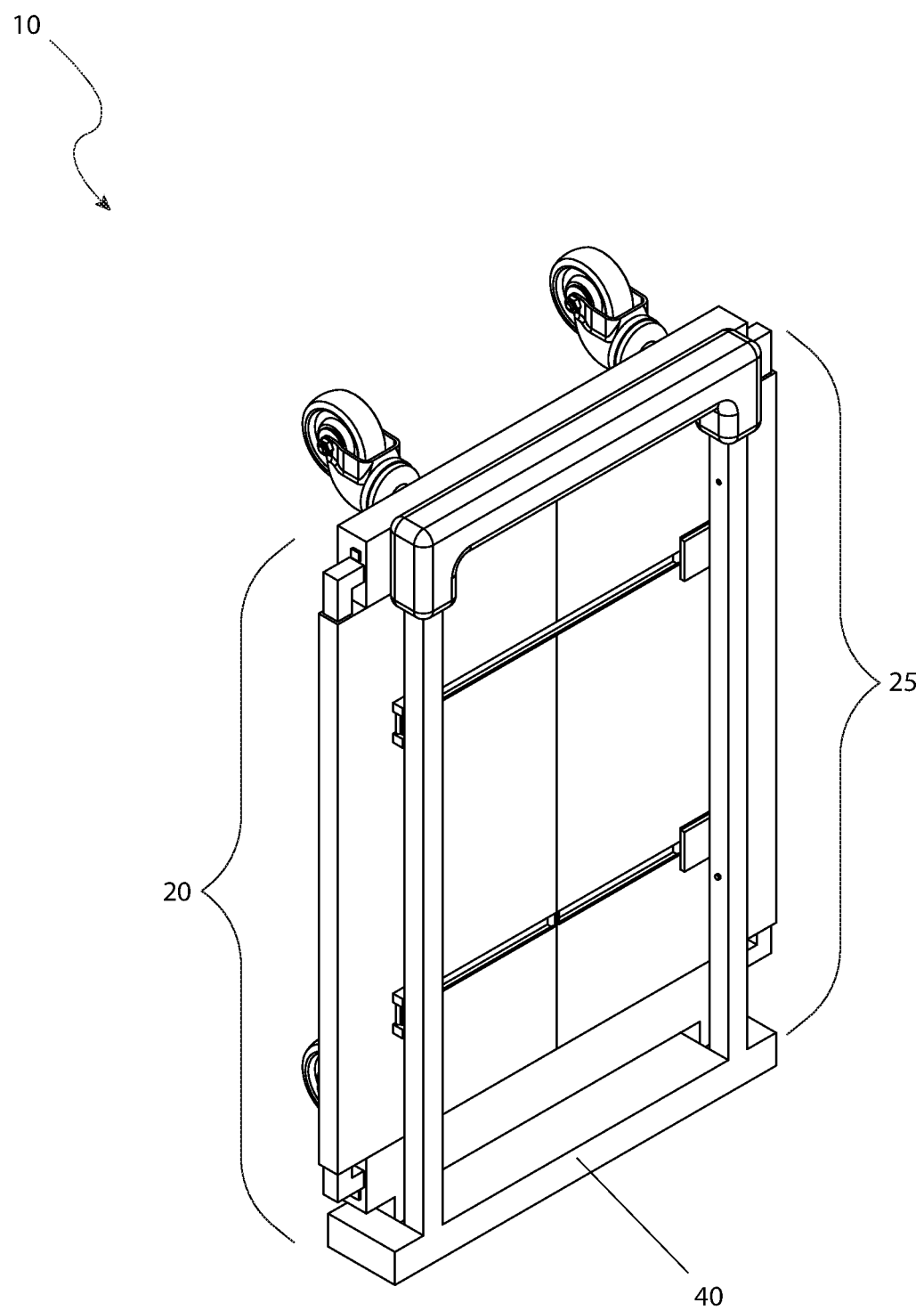
FIG. 10 is a perspective view of the car seat transport device in a retracted state, according to the preferred embodiment of the present invention.

Referring to FIG. 10, a perspective view of the device 10 in a retracted state, according to the preferred embodiment of the present invention is disclosed. The handle section 25 in a collapsed state, with the retracting inner handles 60 inside of the lower outer handles 55 (both of which are shown in FIGS. 3 and 4), is positioned parallel to the base section 20. This positioning is enabled by the folding hinge mechanism 40 which allows movement of the handle section 25 along the handle folding travel path "b" 45 (as shown in FIG. 2). This configuration as shown is viewed as being beneficial when the device 10 is being stored when not in use, such as a closet at home, or in an overhead luggage bin on a plane. The device 10 occupies a minimum amount of volume and allows for easy transport when not in use on a trip.

2. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 10. The user would procure the device 10 from conventional procurement channels such as discount stores, department stores, wholesale warehouses, infant product retailers, mail order and internet supply houses and the like.

After procurement and prior to utilization, the device 10 would be prepared in the following manner: the handle section 25 would be placed in an upright position at a ninety degree (90°) angle to the base section 20 using the folding hinge mechanism 40 and the handle release lever 50 along the handle folding travel path "b" 45; the four (4) casters 30 would be placed on grade; the moving upper platforms 85 would be extended outward along the upper platform moving path "d" 95 with the use of the support arms 105, the base locking pins 110 and the base arm support holes 115; the car seat base 120 of the car seat 15 would be set upon the base section 20 and secured in position using the four (4) holding clamps 90 moved into position along the clamp track 125 on the clamp movement path "e" 100. At this point in time the device 10 is ready for use.

During utilization of the device 10, a child may or may not be placed in the car seat 15 and the user would push or pull the device 10 with the car seat 15 attached, while walking in locations such as an airport, a train station, a store, a shopping mall, a park, or other similar location. Such usage scenarios would be similar to that experienced when using a stroller or similar device.

After use of the device 10, the car seat 15 would be removed by releasing the holding clamps 90, the moving upper platforms 85 would be retracted, and the handle section 25 would be retracted and folded along the handle extension travel path "c" 70 and the handle folding travel path "b" 45 respectively using the folding hinge mechanism 40. At this point in time the device 10 would be stored until needed again.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A car seat transport device comprising:
    a base section having a fixed bottom platform and a pair of moving upper platforms, wherein the fixed bottom platform supports four 360-degree casters each disposed at an outer corner of the fixed bottom platform, and wherein the pair of moving upper platforms are extendable outwardly along an upper platform moving path and each support a pair of holding clamps, the pair of moving upper platforms being supported by a plurality of support arms that are locked into position by a set of base locking pins;
    a handle section attached to the base section by a folding hinge mechanism, wherein the handle section includes a pair of lower outer handles, a pair of retracting inner handles slidably positioned within the pair of lower outer handles, and a handle cap connecting the pair of retracting inner handles, and wherein the retracting inner handles are extendable along a handle extension travel path and are lockable in an extended position by a pair of handle extension locking pins, and wherein the folding hinge mechanism permits the handle section to fold flat against the base section along a handle folding travel path upon actuation of a handle release lever; and,
    a planar car seat positioned in a horizontal orientation and secured to the pair of moving upper platforms via the holding clamps, such that a car seat back of the car seat rests against the pair of retracting inner handles to stabilize the car seat during transport; and,
    wherein the holding clamps are repositionable along a clamp movement path formed in clamp tracks disposed on the moving upper platforms to accommodate different car seat widths; and wherein the base section and handle section together enable the transport of the car seat with or without a child seated therein.

2. The car seat transport device of claim 1, wherein the pair of retracting inner handles retract into the pair of lower outer handles when the pair of handle extension locking pins are simultaneously pressed, and wherein the entire handle section folds flush against the base section to permit storage of the device in a compact form.

* * * * *